INVENTORS
N. R. WILSON
T. J. NAVE

BY

Young + Quigg

ATTORNEYS

United States Patent Office 3,479,420
Patented Nov. 18, 1969

3,479,420
BLOW MOLDING PARISONS USING
FLUID SEALING
Newton R. Wilson and Thomas J. Nave, Bartlesville, Okla., assignors to Phillips Petroleum Company, a corporation of Delaware
Filed May 29, 1967, Ser. No. 641,812
Int. Cl. B29d 23/03
U.S. Cl. 264—89                    6 Claims

ABSTRACT OF THE DISCLOSURE

An open ended parison to be molded is closed adjacent its open end by use of at least one fluid stream.

---

Figure 2:
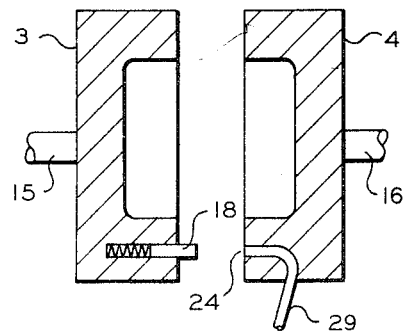

This invention relates to a new and improved method for molding plastic parisons as formed.

Heretofore a hollow, highly heated tube of plastic (parison) has been clamped between two mold halves and air introduced into the hollow interior thereof to expand same outwardly to conform with the interior configuration of the mold halves thereby forming a molded article. Parisons are usually formed continuously and after a certain predetermined length of parison has been formed the mold halves are closed thereabout and the blow molding operation carried out.

Because the parison is in a highly heated state before it is molded the sides of the parison tend to stick to one another when brought into contact and, therefore, it is desirable to make sure that the parison does not collapse to any degree before the molding operation. It is often desirable to partially inflate the parison before molding so that a molded article having a uniform wall thickness can be formed. One way of preventing collapsing of the heated parison is to introduced a pressurized fluid such as air into the interior of that parison. However, to preblow the parison it is necessary to close the open end thereof to prevent escape of the pressurized fluid. In some instances it is desirable to direct the parison to one side of a mold containing slidable inserts to insure that a portion is pinched out to form handles, etc.

It is difficult to close the open end of the parison without unduly cooling at least some portion of the parison that is to be subsequently blow molded, undue cooling causing undue thickening of the cooled portion with undue thinning of adjacent hotter areas during blow molding thereby providing a molded article of a nonuniform wall thickness. It was heretofore thought to be particularly difficult to use any means closely related to what was considered in the art to be cooling devices and therefore the use of fluid streams was heretofore thought not to be suitable for such operations.

It has now been found that a heated parison can be closed as to its open end using a fluid stream if the fluid stream is directed against an external portion of the heated parison adjacent the open end so as to collapse the parison sides against one another while the mold halves are moved towards one another to clamp about the parison for subsequent molding of same. To prevent undue cooling, it is important to use the fluid stream only while the mold halves are moved towards one another. By this particular method it has been found that the open end of the parison is satisfactorily sealed for the introduction of the pressurized fluid into the interior thereof without unduly cooling portions of the heated parison that are to be subsequently molded. The fluid stream itself is directed primarily toward a portion of the heated parison which is adjacent the open end and which is normally almost completely trimmed from the final molded article as scrap so that cooling of that portion does not susbtantially affect the wall thickness of the molded article.

Also according to this invention there is described apparatus for closing the open end of a heated parison that is to be molded between mold halves wherein at least one mold half carries fluid spray means in a manner such that fluid sprayed therefrom is directed towards a predetermined area relative to the opposing mold half, i.e. the area corresponding to the area of the mold half where the spray means is carried, and means is provided for admitting the fluid under pressure to both said spray means and the interior of the parison when said mold halves are moved towards one another.

The method of this invention is useful for making a wide variety of molded plastic articles such as bottles, bottle carriers, tote boxes, and the like.

Accordingly, it is an object of this invention to provide a new and improved method for forming molded plastic articles. A particular object of this invention is to provide a new and improved method for blow molding plastic parisons.

Other aspects, objects and the several advantages of the invention will be apparent to those skilled in the art from the following description and the appended claims.

Figure 1:
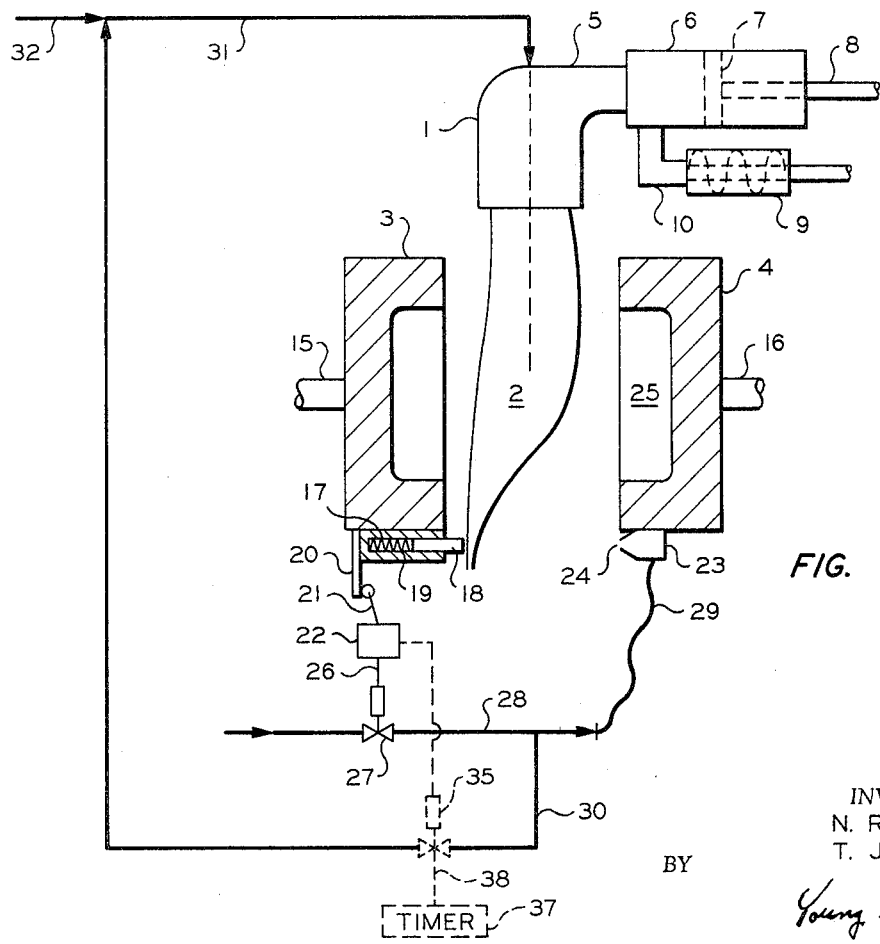

In the drawings, FIGURE 1 shows the system embodying the invention.

Figure 3:
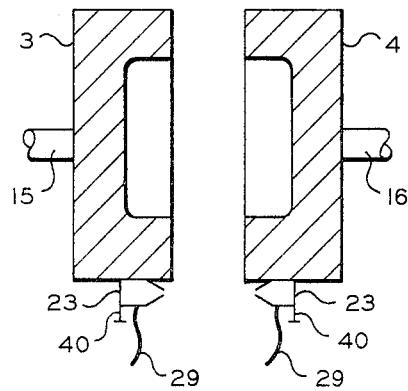

FIGURES 2 and 3 show embodiments of the invention different from that of FIGURE 1.

In FIGURE 1, there is shown an extruder die 1 from which is issuing a hollow, heated, cylindrical, parison 2. Parison 2 issues downwardly between spaced apart mold halves 3 and 4. Die 1 is operatively connected through conduit 5 to an accumulator 6 which has a piston 7 therein connected to supporting rod 8 which extends exteriorly thereof. The material from which the parison is formed is supplied to accumulator 6 from a conventional extruder 9 (not completely shown) through conduit 10.

Mold halves 3 and 4 are movable towards and away from one another by conventional power means (not shown) which is connected to rods 15 and 16.

Mold 3 carries on the bottom edge thereof a hollow cylinder 17 which is open at one end and slidably carries piston 18 in that open end. Piston 18 is resiliently biased towards mold 4 when molds 3 and 4 are in a spaced apart relation as shown in the drawing by way of resilient means 19 which can be a coiled spring or similiarly functioning known apparatus.

Arm 20 extends downwardly from mold 3 so as to contact trip arm 21 of microswitch 22 when mold 3 is moved towards molds 4 at the beginning of the blow molding operation. Thus, when mold halves 3 and 4 are moved towards one another to clamp parison 2 for blow molding thereof, switch 22 is actuated at the start of movement of the mold halves.

Mold half 4 carries on the bottom side thereof hollow member 23 which has an opening 24 in the side thereof which faces the area on mold half 3, i.e. piston 18. The height of opening 24 varies from 1 or 2 mils up to a quarter of an inch or more and is of a width which is substantially the same as the width of mold 4 when looking directly into cavity 25 of that mold from the position of mold half 3. Piston 18 can have a width substantially the same as that of opening 24.

Microswitch 22 is operatively connected in a conventional manner by way of a wire or wires 26 to a conventional, normally closed solenoid valve 27. Valve 27 is operatively connected to conduit 28 which is connected to a source of fluid under pressure and also to fluid spray means 23 by way of stretchable conduit 29. Stretchable conduit 29 can be any conventional material such as coiled rubber tubing. Conduit 28 is also connected to conduit 30 which in turn is connected to conduit 31. Conduit 31 supplies fluid under pressure through die head 1 and into the hollow interior of parison 2. Supplementary fluid under pressure can be supplied to the system by way of conduit 32.

Supplementary air conduit 32 is normally used to admit higher pressured fluid to the interior of parison 2 after mold halves 3 and 4 have clamped. This fluid is used to force the clamped parison out against the interior surfaces of mold halves 3 and 4 thereby forming the molded article.

Normally, supplementary fluid is desirably supplied only to conduit 31 so that, if it is desired to conserve the fluid in conduit 32, conduit 30 can be closed at or before the fluid in conduit 32 is passed into conduit 31 but at or after mold halves 3 and 4 have clamped around parison 2. This can be accomplished by mounting a normally closed solenoid valve 35 in conduit 30 and operably connecting the same by a wire or wires to switch 22 so that both valves 27 and 35 are opened by the actuation of switch 22. In addition, valve 35 is operably connected to a conventional timer means 37 by way of a wire or wires 38, which timer means is set to allow valve 35 to stay open for only a predetermined length of time. Thus, after timer 37 times out valve 35 is closed while valve 27 stays open. Thereafter, when higher pressure fluid in conduit 32 is passed into conduit 31 this fluid is stopped in conduit 30 by closed valve 35.

It should be noted that the use of valve 35 is not necessary to the operation of the invention but can be desirable in order to conserve the high pressure fluid in conduit 32 since this fluid is not usually necessary for use in spray 23 but is necessary for the actual blow molding of parison 2.

FIGURE 2 shows an embodiment of the invention wherein the minimum amount of parison is wasted by mounting the spray outlet 24 and opposing piston 18 as close as possible to the bottom surfaces of the mold cavities in mold halves 3 and 4 without structurally weakening the mold halves. By this embodiment wherein the spray means and opposing piston 18 are mounted directly in the mold halves themselves, the parison need not extend below the bottom surfaces of the mold halves and this amount of parison material is conserved thereby reducing the waste material trimmed from the molded article.

FIGURE 3 shows an embodiment of the invention wherein opposing spray means are carried by mold halves 3 and 4 and aligned so that they spray fluid received from lines 29 directly at the orifices of one another thereby obviating the need for piston 18. Since the fluid streams from both spray means should meet one another in order to properly collapse the parison, it is desirable to mount both spray means on the mold halves with adjustable fixing means 40 so that each spray means can be varied in a vertical plane to obtain the exact alignment desired. Adjustable means 40 can be any conventional device such as a conventional thumb screw.

In operation, in FIGURE 1, mold halves 3 and 4 are in their normal spaced apart relationship while a predetermined length of parison 2 is melt extruded through die head 1. When the proper length of parison 2 has been extruded, i.e. a portion thereof extends below the bottom surfaces of mold halves 3 and 4, the parison extrusion is stopped or slowed and the mold halves are moved towards one another. As soon as movement of the mold halves starts, switch 22 is actuated, thereby opening valve 27 and allowing pressurized fluid to pass through conduits 28 and 29 into spray means 23 and out orifice 24 thereby impinging on a lower portion of parison 2 adjacent the open end thereof and pushing the entire lower end of the parison towards collapse and towards piston 18. Eventually, piston 18 contacts the parison and the open end thereof is collapsed by bringing opposite sides of the parison into contact with one another. Since the parison is still in the heated condition due to the extrusion process it has just undergone, contacting of the interior surfaces of the parison under the pressure of the fluid stream emitted from spray 23 is sufficient to seal the open end of the parison.

While the open end of the parison is being sealed, fluid under pressure is being supplied to the interior of the parison by way of conduit 31 thereby positively preventing any premature collapsing of the parison in the area of the parison which is to be subsequently blow molded. In addition, fluid supplied to the interior of the parison can be of sufficient pressure to cause some pre-blowing of the parison if desired. After the mold halves 3 and 4 have clamped about parison 2 fluid under a higher pressure than that supplied through conduit 28 is supplied to conduit 31 by way of conduit 32 to force parison 2 out against the internal surfaces of mold halves 3 and 4 thereby forming a molded article. Thereafter mold halves 3 and 4 are drawn away from one another, the molded article severed from the remainder of parison 2 and the cycle repeated.

This invention is applicable to substantially any formable plastic material, especially thermoplastics. Generally, this invention applies to homopolymers and copolymers formed from 1-olefins having from 2–8 carbon atoms per molecule, inclusive, polyamides, polyesters, polyvinyl alcohol, acrylic polymers, polyvinyl chloride, polyvinyl acetate, polyvinylidene chloride, and the like, and mixtures thereof.

The material from which the parison is formed should be heated to a temperature sufficient to cause portions of the parison to stick to one another when brought into contact with one another under slight pressure. Such temperatures are normally provided by the parison forming process such as the melt extrusion process disclosed in FIGURE 1. However, if desired, additional heating of the parison can be provided, at least in the area of the open end which is to be collapsed so as to assure sealing of the open end on collapsing.

Generally, the parison should be heated to at least about the softening point of the polymer from which the parison is made, the softening point being determined in accordance with ASTM D–1525–58T. The term "at least about the softening point" is meant to includue temperatures up to 20° C. below the softening point since some materials such as polypropylene, upon cooling, remain sufficiently tacky to seal upon contact at temperatures up to 20° C. below their softening point. Generally, however, a polymer will be of a temperature of at least its softening point when collapsed in accordance with the method of this invention.

The fluid under pressure utilized in either of conduits 28 or 32 can be any desirable fluid such as air, nitrogen, and the like and can be preheated or at room temperature. The pressure of the fluid employed in conduits 28 through 31 will generally be in the range of from about 1 to about 30 p.s.i.g. although higher or lower pressures can be used depending upon the particular materials used to make the parison and the wall thickness of the parison itself. The pressure of the fluid in conduit 32 will be that which is sufficient to blow mold the parison and will generally be greater than the pressure of the fluid employed in conduit 28.

EXAMPLE

Polyethylene having a density of 0.96 gram per cubic centimeter at 25° C. and a melt index of 0.2 is extruded at a temperature of about 400° F. to produce a hollow, cylindrical parison using the apparatus shown in FIGURE 1. The parison is continuously extruded through die 1 until the lower, open end thereof extends between and below piston 18 and orifice 24. Extrusion is stopped and molds 3 and 4 move towards one another and just as they start their movement towards one another switch 22 is actuated thereby opening valve 27 and admitting air under pressure of 25 p.s.i.g. to the interior of spray means 23. After mold halves 3 and 4 move into contact with and close about parison 2, air under pressure of 60 p.s.i.g. is admitted to conduit 31 to blow mold that portion of the parison clamped between mold halves 3 and 4.

The 60 p.s.i.g. air is admitted to conduit 31 about 3 seconds after valve 27 is opened. Thus, if valve 35 is employed in conduit 30 and opened at the same time as valve 27 by way of the actuation of switch 22, timer 37 will be set to time out in 3 seconds at which time valve 35 is closed so that valve 35 is closed at about the same time that the higher pressure air is admitted to conduit 31.

Obvious variations and modifications of this invention can be made, or followed, in view of the foregoing, without departing from the spirit or scope thereof.

What is claimed is:

1. A method for closing the open end of a heated, hollow plastic parison comprising forming said parison so as to pass between two spaced apart mold halves, said parison being heated to a temperature sufficient to cause portions thereof to stick to one another when brought into contact, moving said mold halves towards one another to clamp said parison therebetween after said parison has reached a predetermined length, while moving said mold halves towards one another directing a stream of fluid under pressure from at least one mold half towards the corresponding area of the opposing mold half and against an external portion of said parison adjacent said open end so as to cause collapse of said open end thereby bringing opposing heated internal sides of said parison in said collapsed portion into contact wth one another and introducing fluid under pressure into the interior of said parisons while said mold halves are moved toward one another.

2. A method according to claim 1 wherein said parison is formed from at least one polymer selected from the group consisting of polymers of 1-olefins having from 2–8 carbon atoms per molecule, inclusive, polyamides, polyesters, polyvinyl alcohols, acrylic polymers, polyvinyl chloride, polyvinylidene chloride, and polyvinyl acetate, and mixtures thereof, and said parison is at a temperature while being collapsed of at least about the softening point of the polymer from which the parison is made as determined by ASTM D–1525–58T.

3. The method according to claim 1 wherein said parison is formed by melt extrusion.

4. The method according to claim 1 wherein said parison is formed by melt extruding at least of a homopolymer and a copolymer each formed from 1-olefins having 2–8 carbon atoms per molecule, inclusive, and said parison while being collapsed is at a temperature of at least about the softening point of the polymer that forms the parison as determined by ASTM D–1525–58T.

5. The method acocrding to claim 4 wherein said polymer is one of polyethylene, polypropylene, mixtures thereof, and copolymers of ethylene and propylene, and said fluid is air.

6. The method acording to claim 1 wherein said parison while being collapsed is at a temperature of a least about the softening point of the polymer forming the parison as determined by ASTM D–1525–58T.

References Cited

UNITED STATES PATENTS

| | | | |
|---|---|---|---|
| 2,690,592 | 10/1954 | Schanz | 18—14 |
| 3,239,402 | 3/1966 | Ecklund | 264—172 XR |
| 3,300,556 | 1/1967 | Battenfeld | 264—98 |
| 3,311,684 | 3/1967 | Heider | 264—99 |

ROBERT F. WHITE, Primary Examiner

R. C. KUCIA, Assistant Examiner

U.S. Cl. X.R.

18—5; 264—96, 98, 209